US009100704B2

(12) United States Patent
Cordoba

(10) Patent No.: US 9,100,704 B2
(45) Date of Patent: *Aug. 4, 2015

(54) METHOD FOR REESTABLISHING PRESENTATION OF A PAUSED MEDIA PROGRAM

(71) Applicant: AT&T Intellectual Property I, LP, Atlanta, GA (US)

(72) Inventor: Juan Cordoba, Jacksonville, FL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,645

(22) Filed: Jun. 16, 2014

(65) Prior Publication Data

US 2014/0298390 A1  Oct. 2, 2014

Related U.S. Application Data

(63) Continuation of application No. 14/023,124, filed on Sep. 10, 2013, now Pat. No. 8,793,744, which is a continuation of application No. 11/679,679, filed on Feb. 27, 2007, now Pat. No. 8,601,517.

(51) Int. Cl.
| | |
|---|---|
| *H04N 7/16* | (2011.01) |
| *H04N 7/20* | (2006.01) |
| *H04N 7/18* | (2006.01) |
| *H04N 7/173* | (2011.01) |
| *H04N 21/472* | (2011.01) |
| *H04L 12/28* | (2006.01) |
| *H04N 21/41* | (2011.01) |
| *H04N 21/433* | (2011.01) |
| *H04N 21/4402* | (2011.01) |

(52) U.S. Cl.
CPC ...... *H04N 21/47217* (2013.01); *H04L 12/2832* (2013.01); *H04N 7/163* (2013.01); *H04N 21/4126* (2013.01); *H04N 21/4333* (2013.01); *H04N 21/4334* (2013.01); *H04N 21/4402* (2013.01); *H04L 2012/2849* (2013.01)

(58) Field of Classification Search
CPC ............. H04N 21/4334; H04N 21/63; H04N 21/47217; H04N 7/136; H04N 21/4126; H04N 21/4333; H04N 21/4402; H04L 12/2832
USPC ........... 725/54, 55, 62, 68, 85, 100, 110, 120, 725/139, 151
See application file for complete search history.

(56) References Cited

U.S. PATENT DOCUMENTS

| | | |
|---|---|---|
| 7,344,084 B2 | 3/2008 | DaCosta |
| 2003/0229900 A1 | 12/2003 | Reisman |
| 2005/0097623 A1 | 5/2005 | Tecot et al. |
| 2005/0166258 A1 | 7/2005 | Vasilevsky |
| 2006/0069687 A1 | 3/2006 | Cui et al. |
| 2008/0163330 A1 | 7/2008 | Sparrell |

*Primary Examiner* — Pankaj Kumar
*Assistant Examiner* — Alazar Tilahun
(74) *Attorney, Agent, or Firm* — Guntin & Gust, PLC; Douglas Schnabel

(57) ABSTRACT

A method for reestablishing presentation of a paused media program is disclosed. A system that incorporates teachings of the present disclosure may include, for example, a Set-Top Box (STB) located in a building can have a controller element that presents a media program to a media device operable only in the building, pauses presentation of the media program responsive to a pause request, generates a departure mark that identifies a presentation point in the media program associated with the pause request, receives a request to resume presentation of the media program from the departure mark at a portable communication device capable of maintaining communications with the STB outside the building, and transmits to the portable communication device a presentation of the media program from the departure mark. Additional embodiments are disclosed.

20 Claims, 3 Drawing Sheets

100

# US 9,100,704 B2

METHOD FOR REESTABLISHING PRESENTATION OF A PAUSED MEDIA PROGRAM

RELATED APPLICATIONS

This application is a continuation of U.S. patent application Ser. No. 14/023,124, filed Sep. 10, 2013, which is a continuation of U.S. patent application Ser. No. 11/679,679 filed Feb. 27, 2007, now issued as U.S. Pat. No. 8,601,517, which is incorporated herein by reference in its entirety.

FIELD OF THE DISCLOSURE

The present disclosure relates generally to multimedia applications, and more specifically to a method for reestablishing presentation of a paused media program.

BACKGROUND

With the advent of media recording devices such as a digital video recorder (DVR), consumers can pause a live video program and resume viewing at a later time. Some DVRs may be capable of pausing a program and reestablishing viewing at a TV set different from the one from which the program was originally paused. Although such technology has proven useful, it is not helpful to consumers who desire continued presentation of the paused media program while commuting outside a residence where the DVR is located.

A need therefore arises for a method for reestablishing presentation of a paused media program.

DETAILED DESCRIPTION

Embodiments in accordance with the present disclosure provide a method for reestablishing presentation of a paused media program.

In a first embodiment of the present disclosure, a Set-Top Box (STB) located in a building can have a controller element that presents a media program to a media device operable only in the building, pauses presentation of the media program responsive to a pause request, generates a departure mark that identifies a presentation point in the media program associated with the pause request, receives a request to resume presentation of the media program from the departure mark at a portable communication device capable of maintaining communications with the STB outside the building, and transmits to the portable communication device a presentation of the media program from the departure mark.

In a second embodiment of the present disclosure, a computer-readable storage medium in a portable communication device can have computer instructions for transmitting to a Set-Top Box (STB) located in a building a request to resume presentation at the PCD from a departure mark a media program paused by a media controller.

Figure 1:
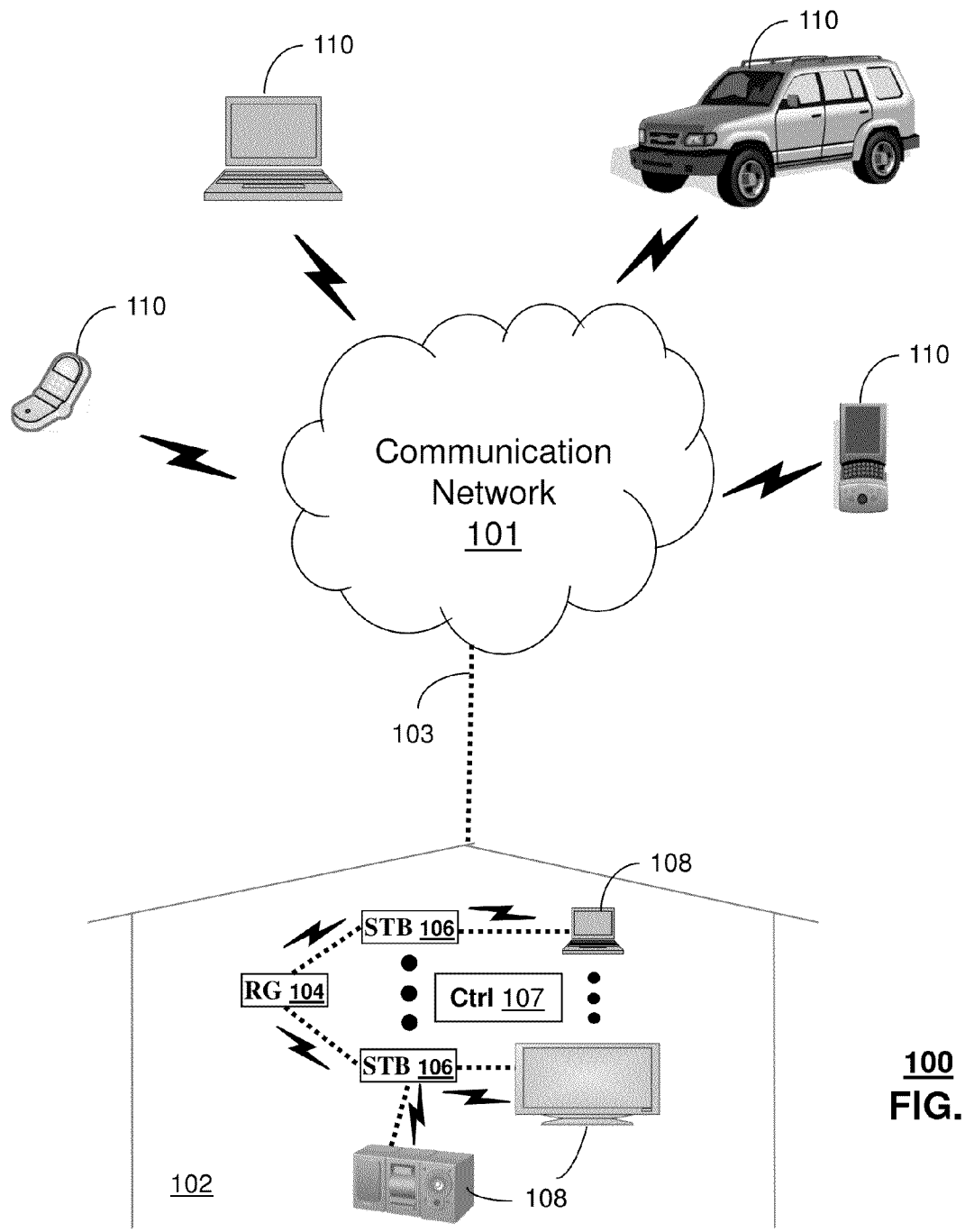
FIG. 1 depicts an exemplary embodiment of a communication system.

In a third embodiment of the present disclosure, a method can involve reestablishing presentation of a paused media program from a departure mark in transition from a fixed media device to a portable communication device FIG. 1 depicts an exemplary embodiment of a communication system 100. The communication system 100 can comprise a communication network 101 coupled to one or more portable communication devices (PCDs) 110 and a common residential gateway (RG) 104 located in a building 102. The RG 104 distributes media signals from the communication network 101 to one or more Set-Top Boxes (STBs) 106. The STBs 106 can perform common processing tasks to extract media programs delivered by the communication system 100 by way of the RG 104. The STBs 106 can selectively present media programs to media devices 108 such as a stereo audio system, a television set, a computing device, and so forth. Selection of the media programs can be managed with a media controller 107 such as a common infrared or radio frequency (RF) controller.

The media programs can comprise presentation of moving images (e.g., video), still images (e.g., playback of JPEG or GIF pictures), and/or audio (e.g., video with audio, pictures with audio, playing MP3 music, etc.). The distribution of signals between the RG 104, the STBs 106, and media devices 108 can take place by way of common wiring (e.g., coaxial cable or xDSL cable) or wireless means (e.g., Wireless Fidelity or WiFi or other suitable form of short-range wireless transmission).

The communication network 101 can comprise common circuit-switched and packet-switched network elements (e.g., switches and routers) for providing interconnectivity between the PCDs 110 and the STBs 106. The communication network 101 can support common wireless access protocols such as cellular (e.g., GSM, CDMA, GPRS, EV-DO, UMTS, etc.), Worldwide Interoperability for Microwave Access or WiMAX, Ultra Wide Band or UWB, and other present and next generation access technologies. Additionally, the communication network 101 can support dynamic wireless access technologies by way of software defined radio (SDR) techniques in which the PCDs 110 and/or corresponding base stations of the communication network 101 can dynamically transition between access protocols.

The PCDs 110 can include common wireless transceiver technologies to support the aforementioned wireless access technology protocols. Additionally, the PCDs 110 can utilize common computing technologies such as a microprocessor and/or digital signal processor, storage media (e.g., hard drive, flash memory, etc.), display technology (e.g., LCD color display), audio system for intercepting and conveying audio messages, and keypad (depressible or touch sensitive). The functions of the audio system, display and keypad of the PCD can collective represent a user interface (UI).

The communication network 101 can further include technologies for distributing media programs. In one embodiment, a portion of the communication network 101 can include a number of Internet Protocol Television (IPTV) subsystems (e.g., a satellite receiver, a super head office server or SHS, video head offices or VHOs, video head servers or VHSs, and so on). The IPTV subsystems together can provide broadcast media programs (e.g., Nickelodeon, MTV, NBC, C-SPAN, ESPN, radio, music, etc.) as well as media programs on demand (e.g., video on demand, music on demand like iTunes, etc.) which the STBs 106 can selectively present to the media devices 108 as standard or high-definition media programs in response to entries made on a media controller 107. Alternatively, or in combination, the communication network 101 can utilize common network elements that distribute analog signals over a number of carrier frequencies which can be selectively retrieved by the STBs 106 utilizing common signal processing techniques.

The communication network 101 can also utilize common circuit-switched network elements such as those found in a public switched telephone network (PSTN) to provide voice communications between the media devices and other users of the communication network. Alternatively, the communication network 101 can utilize packet-switched network elements (e.g., IP-based, MPLS, or like protocols) such as routers and gateways to support Voice over IP (VoIP) between the media devices 110 and other end points in the communication network 101. In yet another embodiment, the communication network 101 can combine the functions of a PSTN and IP network under an IP Multimedia Subsystem (IMS) architecture to provide combined circuit-switched and packet-switched communication services.

Figure 2:
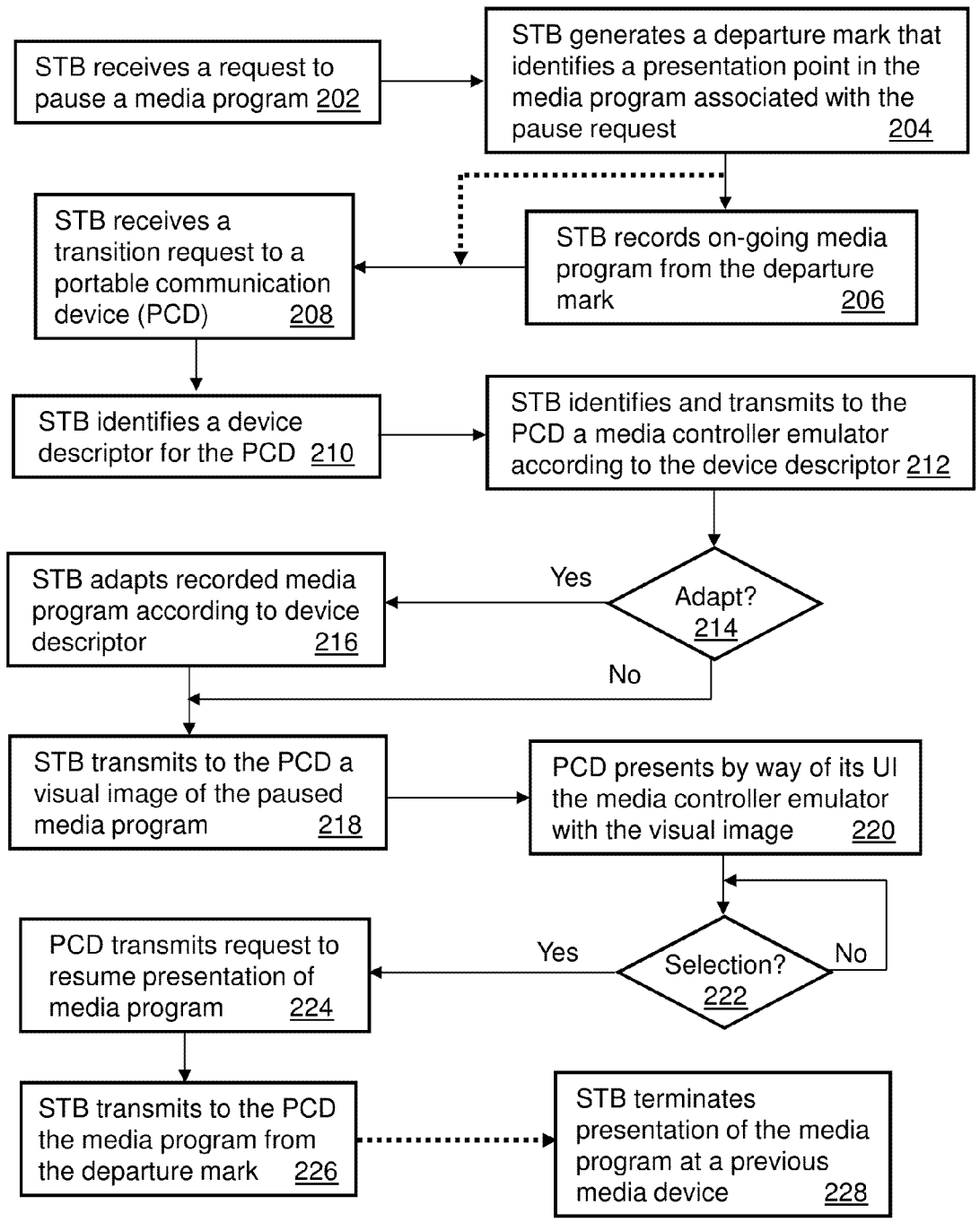
FIG. 2 depicts an exemplary method operating in portions of the communication system.

FIG. 2 depicts an exemplary method 200 operating in portions of the communication system 100. Method 200 begins with step 202 where the STB 106 receives a request to pause a media program being presented at one of the media devices 108 in building 102. The request to pause can originate from infrared or RF signals transmitted by the media controller 107 or the PCD 110 using short-range signals while in building 102. The media program being paused can represent an audio-only media program (e.g., radio, music downloads, etc.), a video and audio media program (e.g., a television show, on-demand movies, etc.), personalized media program (e.g., viewing personal movies and/or pictures) or some other form of media programming. In step 204, the STB 106 generates a departure mark that identifies a presentation point in the media program associated with the pause request. The presentation point can be a video frame, an elapsed time since the program started, a track number and time elapsed for an audio program, or other suitable form of departure marking for identifying where the media program was paused. From the departure mark, the STB 106 records in step 206 an on-going media program.

Referring back to step 202, the request to pause the media program can result in said program being paused at a media device 108 from which it was being presented, or maintaining presentation of said program without interruption at the media device. This latter alternative can be useful in a multi-party use case in which some individuals would desire uninterrupted presentation of the media program, while another party desires a pause of the program to attend to other matters, or to experience the media program on a PCD 110. In either embodiment, the STB 106 marks and records the paused media program according to steps 204-206.

Referring back to step 206, if the media program being paused is not a live broadcast from the communication network 101, but rather is being played from a CD, DVD, or local memory (e.g., hard drive) of the STB 106, then step 206 can be ignored in which case the STB proceeds to step 208 where it receives a transition request to a select one of the PCDs 110 in FIG. 1 (e.g., video and/or audio portion of a telemetry system in an automobile, a portable laptop, a cell phone, or a PDA). The transition request can originate from the media controller 107, or the selected PCD 110 while located in building 102 or remotely by way of the communication network 101.

In step 210, the STB 106 identifies a device descriptor for the selected PCD 110. The device descriptor can comprise, for example, one or more display parameters (e.g., display resolution, color capabilities, pixel density, etc.), one or more audio parameters (stereo, surround sound, single channel, etc.), and one or more communication identifiers of the select PCD 110 (e.g., a Session Initiation Protocol Uniform Resource Identifier or SIP URI of the PCD, a Tel URI of the PCD, a static IP address of the PCD, or other form of communication addressing for the PCD). The device descriptor can be selectively identified in step 210 by the STB 106 by indexing a storage medium (e.g., database of the STB or remote server accessible by way of the communication network 101) using a device identifier (e.g., phone number, serial number, MAC address, etc.) of the PCD 110.

With the device descriptor, the STB 106 identifies in step 212 a media controller emulator for the PCD 110. The media controller emulator can represent a software client that is transmitted to the PCD 110 to emulate a media controller function by way of the PCD's user interface or UI (e.g., display, audio system and/or keypad). The emulation of a media controller can include settings for soft keys on a display of the PCD 110, a special rendering of the UI so that viewable images are presented with soft functions such as pause, rewind, play, fast forward, chapter or track selections, and so on. The media controller emulator can be selected by the STB 106 from a database of media controller emulators stored in a memory of the STB or retrieved from a remote database accessible by way of the communication network 101.

In step 214, the STB 106 determines if the media program paused in step 202 requires adaptation before it is presented at the PCD 110. If no adaptation is required because the PCD 110 has presentation capabilities consistent with the original format of the media program, the STB 106 proceeds to step 218. If on the other hand the display resolution of the PCD 110 determined from its device descriptor is inconsistent with the original format of the media program, then the STB 106 proceeds to step 216. In this step the STB 106 can execute common applications that can adapt the original media program to a desired screen resolution, display format (e.g., landscape versus picture), color setting, audio quality, frame speed, and so on. The adaptation process can be tailored to match the operational UI parameters of the PCD 110 according to the PCD's device descriptor. Similar adaptation techniques can be applied to audio-only media programs. In cases where the PCD 110 has memory limitations and cannot readily store a media program, the original media program recorded by the STB 106 can be adapted utilizing common compression techniques for transmission as a compressed streamed media program.

Once the adaptation process has been completed in step 216, the STB 106 proceeds to step 218 where it transmits to the PCD 110 an adapted visual image of the paused media program. If no adaptation was necessary, the visual image transmitted is derived from the original format of the media program. The visual image can represent a video frame at or near the departure mark, or a video image providing information associated with the paused program (e.g., track or chapter number at which the media program was paused, etc.). The visual image is presented by way of the UI of the PCD 110 in step 220 through the media controller emulator to blend in with the soft key controls of said emulator.

In step 222, the PCD 110 awaits by way of its UI a selection by the end user (tactile and/or audible) of one or more functions of the media controller emulator. Once a selection is detected, the PCD 110 proceeds to step 224. Assuming by way of example that the selection is a resumption of play of the paused media program, the PCD 110 transmits said request to the STB 106. At this point, the STB 106 transmits to the PCD 110 the media program (adapted if step 216 was invoked) from the departure mark. The transmission can represent a compressed streamed media program or other formats suitable for presentation at the PCD 110. Once transmission begins to take place, the STB 106 can be programmed in step 228 to terminate presentation of the paused media program at the original media device 108. In a multi-user setting, step 228 can be ignored or executed only in cases where the STB 106 is informed that there are no additional parties desiring to experience the media program at the media device 108.

From the foregoing descriptions, it would be evident to an artisan with ordinary skill in the art that the aforementioned embodiments can be modified, reduced, or enhanced without departing from the scope and spirit of the claims described below. For example, the adapted (or unadapted) media program can be transmitted in its entirety or in part to the PCD 110 using progressive download techniques, thereby offloading the STB 106 from having to stream said program to the PCD. Additionally, the adaptation process can be delegated to the PCD 110 instead of the STB 106. These are but a few examples of how the embodiments described herein can be updated without altering the scope of the claims. Accordingly, the reader is directed to the claims for a fuller understanding of the breadth and scope of the present disclosure.

Figure 3:
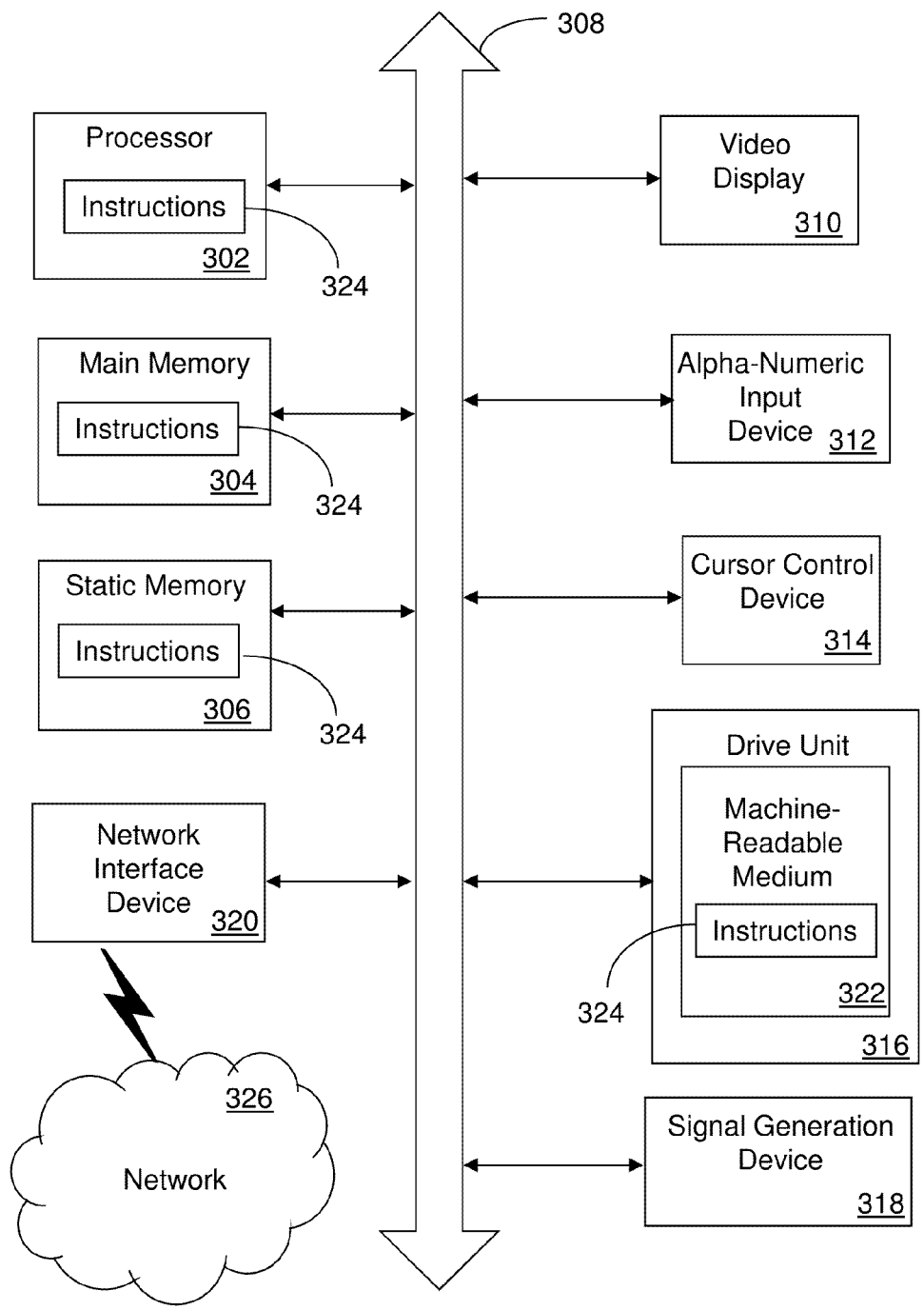
FIG. 3 is a diagrammatic representation of a machine in the form of a computer system within which a set of instructions, when executed, may cause the machine to perform any one or more of the methodologies discussed herein.

FIG. 3 is a diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor device, comprising:
a memory to store executable instructions; and
a processor coupled to the memory, wherein the processor, responsive to executing the executable instructions, performs operations comprising:
receiving a media program from a communication network;
presenting the media program at a display device;
detecting a departure mark during the presenting of the media program;
recording the media program responsive to the detecting of the departure mark to generate a recorded media program;
receiving from a portable communication device a request to present the media program at the portable communication device from the departure mark responsive to selection of a function of a media controller emulator executed by the portable communication device, wherein the media controller emulator is one of a plurality of media controller emulators; and
transmitting the recorded media program by way of the communication network to the portable communication device for enabling presentation of the recorded media program at the portable communication device from the departure mark.

2. The media processor device of claim 1, wherein the portable communication device comprises one of a cell phone, a personal digital assistant, a tablet, a computer, or a telemetry system of an automobile.

3. The media processor device of claim 1, wherein the portable communication device communicates wirelessly with the media processor device by way of the communication network coupled to the media processor device and the portable communication device.

4. The media processor device of claim 1, wherein the processor further performs operations comprising obtaining the recorded media program responsive to the request to resume presentation.

5. The media processor device of claim 1, wherein the processor further performs operations comprising:
identifying a device descriptor associated with the portable communication device;
modifying at least a portion of the recorded media program according to the device descriptor to generate a modified recorded media program; and
transmitting the modified recorded media program to the portable communication device through the communication network.

6. The media processor device of claim 5, wherein the modifying of the recorded media program comprises one of image modification or audio modification.

7. The media processor device of claim 5, wherein the modified recorded media program transmitted to the portable communication device comprises one of an image presentation, an audio presentation, or a combination thereof.

8. The media processor device of claim 5, wherein the modified recorded media program is transmitted as a compressed streamed media program.

9. The media processor device of claim 1, wherein the processor further performs operations comprising continuing presentation of an uninterrupted media program at the display device during the transmitting of the recorded media program.

10. The media processor device of claim 1, wherein the processor further performs operations comprising receiving user-generated input from a media controller to identify the departure mark.

11. The media processor device of claim 1, wherein the processor further perform operations comprising receiving user-generated input from the portable communication device to identify the departure mark.

12. The media processor device of claim 1, wherein the media controller emulator is selected according to a device descriptor associated with the portable communication device.

13. The media processor device of claim 12, wherein the device descriptor comprises one of a display feature, an audio feature, a communication feature, or a combination thereof.

14. The media processor device of claim 1, wherein the processor further performs operations comprising terminating presentation of the media program at the display device.

15. A computer-readable storage device, comprising executable instructions, which, when executed by a processor of a portable communication device, cause the processor to perform operations comprising:

obtaining a media controller emulator for controlling operations of a media processor, wherein the media controller emulator is obtained from a plurality of media controller emulators;

presenting the media controller emulator by way of a user interface of the portable communication device;

receiving from the media processor a recorded media program for presentation at the user interface under control of the media controller emulator, wherein the media program is recorded at the media processor to generate the recorded media program responsive to identifying a departure mark during a presentation of the media program, wherein the recorded media program is adapted for the presentation at the user interface by one of the media processor or the portable communication device, wherein the adaptation of the recorded media program is according to a presentation feature of the user interface, and wherein the recorded media program is received from the media processor by way of a communication network; and presenting the recorded media program at the user interface from the departure mark.

16. The computer-readable storage device of claim 15, wherein the portable communication device comprises one of a cell phone, a personal digital assistant, a tablet, a computer, or a telemetry system of an automobile, and wherein the recorded media program is received by the portable communication device as originally recorded without modification.

17. The computer-readable storage device of claim 15, wherein the portable communication device communicates wirelessly with the media processor by way of the communication network.

18. The computer-readable storage device of claim 15, wherein receiving the recorded media program comprises:

detecting a selection of a function of the media controller emulator to resume presentation of a media program that had been previously paused and recorded by the media processor from a departure mark to generate the recorded media program; and transmitting to the media processor a request to resume presentation of the media program from the departure mark responsive to the selection being detected.

19. A method, comprising:

obtaining, by a portable communication device comprising a processor, a media controller emulator for controlling operations of a stationary media device, wherein the media controller emulator is compatible with operating characteristics of the portable communication device;

presenting, by the portable communication device, the media controller emulator by way of a user interface of the portable communication device while the stationary media device records a media program to generate a recorded media program responsive to identifying a departure mark in the media program;

sending, by the portable communication device, a request to the stationary media device to resume presentation of the media program from the departure mark according to a function of the media controller emulator;

receiving, by the portable communication device, from the media device the recorded media program, wherein the recorded media program is received by the portable communication device from the stationary media device by way of a communication network; and presenting, by the portable communication device, the recorded media program from the departure mark.

20. The method of claim 19, wherein the stationary media device modifies the media program according to a device descriptor of the portable communication device.

* * * * *